(12) United States Patent
Jiao

(10) Patent No.: US 12,368,726 B2
(45) Date of Patent: Jul. 22, 2025

(54) WORM DETECTION METHOD AND NETWORK DEVICE

(71) Applicant: Huawei Technologies Co., Ltd., Shenzhen (CN)

(72) Inventor: Lijuan Jiao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 17/746,883

(22) Filed: May 17, 2022

(65) Prior Publication Data

US 2022/0311793 A1 Sep. 29, 2022

Related U.S. Application Data

(63) Continuation of application No. PCT/CN2020/126856, filed on Nov. 5, 2020.

(30) Foreign Application Priority Data

Nov. 19, 2019 (CN) .......................... 201911137201.5

(51) Int. Cl.
H04L 29/06 (2006.01)
H04L 9/40 (2022.01)

(52) U.S. Cl.
CPC ...... H04L 63/1416 (2013.01); H04L 63/1425 (2013.01); H04L 63/145 (2013.01)

(58) Field of Classification Search
CPC ............... H04L 63/1425; H04L 63/145; H04L 63/1416
See application file for complete search history.

(56) References Cited

U.S. PATENT DOCUMENTS 10,567,405 B1 * 2/2020 Aziz ................... H04L 63/1425
2006/0126522 A1 6/2006 Oh
(Continued)

FOREIGN PATENT DOCUMENTS

CA 2990364 A1 * 6/2018 ......... H04L 63/1425
CN 1773944 A 5/2006
(Continued)

OTHER PUBLICATIONS

Chen, B. et al., "A New Approach for Early Detection of Internet Worms Based on Connection Degree," Proceedings of the Fourth International Conference on Machine Learning and Cybernetics, XP031438392, vol. 4, Aug. 18-21, 2005, 7 pages.
(Continued)

*Primary Examiner* — Tri M Tran
(74) *Attorney, Agent, or Firm* — SLATER MATSIL, LLP

(57) ABSTRACT

A worm detection method and a network device, the method including obtaining first session information of a first host in a first time window, the first session information being session information of the first host that is actively connecting to one or more other hosts, determining, based on the first session information, a data feature corresponding to the first host, the data feature corresponding to the first host describing behavior of the first host accessing the one or more other hosts, and obtaining a prediction result by analyzing, based on a worm detection model, the data feature corresponding to the first host, where the worm detection model is a model generated by training data features corresponding to a plurality of hosts in a first network in which the first host is located, and wherein the prediction result indicates whether the first host is worm-infected.

20 Claims, 7 Drawing Sheets

(56) References Cited

U.S. PATENT DOCUMENTS

| | | | | |
|---|---|---|---|---|
| 2006/0242705 | A1* | 10/2006 | Sadhasivam | H04L 63/145 |
| | | | | 726/23 |
| 2007/0150958 | A1* | 6/2007 | Choi | H04L 63/145 |
| | | | | 726/25 |
| 2010/0071061 | A1* | 3/2010 | Crovella | H04L 63/1425 |
| | | | | 709/224 |
| 2011/0261710 | A1 | 10/2011 | Chen et al. | |
| 2015/0264083 | A1* | 9/2015 | Prenger | G06F 16/285 |
| | | | | 726/23 |
| 2016/0173516 | A1 | 6/2016 | Raugas et al. | |
| 2018/0183815 | A1 | 6/2018 | Enfinger | |

FOREIGN PATENT DOCUMENTS

| | | |
|---|---|---|
| CN | 101184097 A | 5/2008 |
| CN | 101521672 A | 9/2009 |
| CN | 101895521 A | 11/2010 |
| CN | 102111308 A | 6/2011 |
| CN | 103281293 A | 9/2013 |
| CN | 105429977 A | 3/2016 |
| CN | 108234472 A | 6/2018 |
| CN | 108289088 A | 7/2018 |
| CN | 109033836 A | 12/2018 |
| CN | 109510805 A | 3/2019 |
| CN | 109831462 A | 5/2019 |
| CN | 110022313 A | 7/2019 |
| CN | 106416171 B | 6/2020 |

OTHER PUBLICATIONS

Moskovitch, R. et al., "Detection of Unknown Computer Worms Based on Behavioral Classification of the Host," Computational Statistics & Data, XP022627713, vol. 52, No. 9, May 5, 2008, 23 pages.

Whyte, D. et al., "ARP-Based Detection of Scanning Worms Within an Enterprise Network," XP-002412149, Technical Report, School of Computer Science, Jan. 31, 2005, 15 pages.

* cited by examiner

WORM DETECTION METHOD AND NETWORK DEVICE

CROSS-REFERENCE TO RELATED APPLICATIONS

This application is a continuation of International Application No. PCT/CN2020/126856, filed on Nov. 5, 2020, which claims priority to Chinese Patent Application No. 201911137201.5, filed on Nov. 19, 2019. The disclosures of the aforementioned applications are hereby incorporated by reference in their entireties.

TECHNICAL FIELD

This application relates to the field of computer network technologies, further to application of an artificial intelligence (AI) technology in the computer network field, and in particular, to a worm detection method and a network device.

BACKGROUND

A worm has been a major threat to the information security industry. The worm can exploit a security vulnerability, replicate itself, and propagate through a network. The worm can propagate by using file sharing, network sharing, a social network, instant messaging, a removable driver, an email attachment, text information, a software vulnerability, and the like.

Under control of a worm program, a worm-infected host scans for target detection to determine whether other hosts in the network have a vulnerability, open a special port, or the like. When the worm discovers a vulnerability on another host in the network, the worm attacks the vulnerable host and then transfers load to successfully infect the host.

In view of the worm propagation feature, in a current worm detection technology, a quantity of other hosts scanned by a host in a network in a period of time is counted. If the quantity is greater than a threshold, it is determined that the host is worm-infected and is attacking other hosts. Certainly, there are many similar worm detection technologies. For example, statistics may be collected on whether a quantity of destination ports scanned by a host in a network in a period of time exceeds a threshold. If the quantity of the scanned destination ports exceeds the threshold, it is determined that the host is worm-infected and is attacking other hosts.

In the foregoing worm detection technology, a worm-infected host can be detected in the network, but a large quantity of false positives may also exist. Many enterprises have very complex services, and a host in an enterprise network may scan a large quantity of hosts in a period of time for a normal service. In the foregoing worm detection technology, a normal host may be mistakenly determined as a worm-infected host. Therefore, the current worm detection technology has relatively low identification accuracy.

SUMMARY

Embodiments of this application provide a worm detection method and a network device, to improve worm identification accuracy.

According to a first aspect, an embodiment of this application provides a worm detection method. The method includes the following steps, including obtaining first session information of a first host in a first time window, where the first session information is session information of the first host actively connecting to one or more other hosts, determining, based on the first session information, a data feature corresponding to the first host, where the data feature corresponding to the first host is used to describe behavior of the first host accessing the one or more other hosts, and analyzing, based on a worm detection model, the data feature corresponding to the first host to obtain a prediction result, where the worm detection model is a model generated by training, by using a preset training method, data features corresponding to a plurality of hosts in a first network in which the first host is located, and the prediction result is used to indicate whether the first host is worm-infected.

In the first aspect, the worm detection model is trained by pre-learning network behavior of each host in a network accessing one or more other hosts, and then whether a host in the network is worm-infected is determined based on the worm detection model and network behavior of the host, to generate the prediction result for indicating whether the host is worm-infected. The worm detection method according to this embodiment of this application may be applicable to different networks. In other words, a corresponding worm detection model is trained based on network behavior of hosts on each different network. Compared with a conventional technology of detecting and determining worm infection by using a same threshold for all networks without distinction, this method can reduce a false positive rate to some extent, thereby improving worm identification accuracy.

Optionally, in a possible implementation of the first aspect, the worm detection method may further include the following steps, including obtaining session information corresponding to each of at least two hosts in a preset time period, where the session information corresponding to each host is session information of each host actively connecting to one or more other hosts, and the at least two hosts are hosts in the first network, determining, based on the session information corresponding to each host, a data feature corresponding to each host, where the data feature corresponding to each host is used to describe behavior of each host accessing the one or more other hosts, and training, according to a preset training method, the data feature corresponding to each host to generate the worm detection model.

The worm detection model may learn network behavior of each host in a network accessing one or more other hosts, and a successfully trained worm detection model can determine, based on network behavior of a host in the network, whether the host is worm-infected.

Optionally, in a possible implementation of the first aspect, the data feature corresponding to each host is determined in the following manner. The preset time period is divided into a plurality of time windows, and a time length of each of the plurality of time windows is the same as a time length of the first time window. Session information corresponding to one host is selected from the session information corresponding to each of the at least two hosts, and data features corresponding to the selected host in the plurality of time windows are obtained respectively by using the following steps, until the session information corresponding to each of the at least two hosts is processed, so as to obtain data features corresponding to each host in the plurality of time windows respectively. The following steps include allocating, based on start time of the session information corresponding to the selected host, the session information corresponding to the selected host to the plurality of time windows, to obtain session information corresponding to the selected host in the plurality of time windows respectively, determining, based on session information corresponding to the selected host in a second time window in the plurality of time windows, a data feature corresponding to the selected host in the second time window, and obtaining by analogy a data feature corresponding to the selected host in each of the plurality of time windows.

Optionally, in a possible implementation of the first aspect, a propagation chain between hosts is established in the following manner. A byte quantity of each session corresponding to the first host in the first time window is obtained. Each session corresponding to the first host is a session generated when the first host actively connects to another host. A byte quantity of each session corresponding to a second host in a third time window is obtained. The second host is a host to which the first host actively connects in the first time window. The second host is a worm-infected host. Each session corresponding to the second host is a session generated when the second host actively connects to another host. A time length of the third time window is the same as a time length of the first time window. Start time of the first time window is earlier than or equal to start time of the third time window. Whether both the byte quantity of each session corresponding to the first host in the first time window and the byte quantity of each session corresponding to the second host in the third time window meet a first condition is determined. The first condition is used to describe a worm probe process and a worm load transfer process. If both the byte quantity of each session corresponding to the first host in the first time window and the byte quantity of each session corresponding to the second host in the third time window meet the first condition, a similarity between the byte quantity of each session corresponding to the first host in the first time window and the byte quantity of each session corresponding to the second host in the third time window is calculated. A propagation chain between the first host and the second host is established when the similarity is greater than a threshold.

If the start time of the first time window corresponding to the first host is earlier than the start time of the third time window corresponding to the second host, the first host actively connects to the second host in the first time window, and there is a high similarity between the byte quantity of each session corresponding to the first host and the byte quantity of each session corresponding to the second host, the worm-infected first host probably propagates a worm virus to the second host, and therefore, a propagation chain between the first host and the second host may be established. A propagation chain can provide a user with richer and more intuitive information about worm propagation, helping accurately assess impact of a worm in a network in which an infected host is located.

Optionally, in a possible implementation of the first aspect, this embodiment of this application provides a plurality of types of data features generated based on session information, and the data features are useful for constructing a differentiated worm detection model. Specifically, the first session information includes information about at least two sessions. Information about each session in the information about the at least two sessions includes at least one of a 5-tuple of the session, a byte of the session, a packet quantity of the session, a transmission control protocol flag of the session, start time of the session, or end time of the session. The data feature corresponding to the first host includes at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments. The quantity of hosts whose port is scanned is a maximum quantity of different hosts on which a same destination port is accessed by the first host. The short session is a session whose ratio of a byte quantity of the session to a packet quantity of the session is less than a threshold.

Optionally, in a possible implementation of the first aspect, the session information corresponding to each host includes information about at least two sessions corresponding to each host. Information about each session in the information about the at least two sessions corresponding to each host includes at least one of a 5-tuple of the session, a byte of the session, a packet quantity of the session, a transmission control protocol flag of the session, start time of the session, or end time of the session. The data feature corresponding to each host includes at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments. The quantity of hosts whose port is scanned is a maximum quantity of different hosts on which a same destination port is accessed by the first host. The short session is a session whose ratio of a byte quantity of the session to a packet quantity of the session is less than a threshold.

According to a second aspect, an embodiment of this application provides a worm detection method. The method includes the following steps, including obtaining a byte quantity of each session corresponding to a first host in a first time window, where each session corresponding to the first host is a session generated when the first host actively connects to another host, and the first host is a worm-infected host, obtaining a byte quantity of each session corresponding to a second host in a second time window, where the second host is a host to which the first host actively connects in the first time window, the second host is a worm-infected host, each session corresponding to the second host is a session generated when the second host actively connects to another host, a time length of the second time window is the same as a time length of the first time window, and start time of the first time window is earlier than or equal to start time of the second time window, determining whether both the byte quantity of each session corresponding to the first host in the first time window and the byte quantity of each session corresponding to the second host in the second time window meet a first condition, where the first condition is used to describe a worm probe process and a worm load transfer process, if both the byte quantity of each session corresponding to the first host in the first time window and the byte quantity of each session corresponding to the second host in the second time window meet the first condition, calculating a similarity between the byte quantity of each session corresponding to the first host in the first time window and the byte quantity of each session corresponding to the second host in the second time window, and establishing a propagation chain between the first host and the second host when the similarity is greater than a threshold.

In the second aspect, this embodiment of this application provides a solution for constructing a worm propagation chain. The first condition is used in this method to describe the worm probe process and the worm load transfer process. Behavior of successively accessing each other between two worm-infected hosts conforming to the first condition is used to construct a propagation chain between the two hosts.

Based on this, a propagation graph including several propagation chains can be further constructed. A propagation chain and a propagation graph can provide a user with richer and more intuitive information about worm propagation, helping accurately assess impact of a worm in a network in which an infected host is located.

Optionally, in a possible implementation of the second aspect, whether the first host and the second host are worm-infected is determined in the following manner. First session information of the first host in the first time window is obtained. The first session information is session information of the first host actively connecting to one or more other hosts. Second session information of the second host in the second time window is obtained. The second session information is session information of the second host actively connecting to one or more other hosts in the second time window. A data feature corresponding to the first host is determined based on the first session information, and a data feature corresponding to the second host is determined based on the second session information. The data feature corresponding to the first host is used to describe behavior of the first host accessing the one or more other hosts, and the data feature corresponding to the second host is used to describe behavior of the second host accessing the one or more other hosts. The data feature corresponding to the first host and the data feature corresponding to the second host are analyzed based on a worm detection model to obtain a prediction result. The worm detection model is a model generated by training, by using a preset training method, data features corresponding to a plurality of hosts in a first network in which the first host and the second host are located. The prediction result is used to indicate whether the first host and the second host are worm-infected.

In the second aspect, because the worm detection model pre-learns network behavior of each host in a network accessing one or more other hosts, the worm detection model may determine, based on network behavior of the first host and the second host in the network, whether the first host and the second host are worm-infected, and generate a prediction result for indicating whether the first host and the second host are worm-infected.

Optionally, in a possible implementation of the second aspect, the worm detection model is generated in the following manner. Session information corresponding to each of at least two hosts in a preset time period is obtained. The session information corresponding to each host is session information of each host actively connecting to one or more other hosts. The at least two hosts are hosts in the first network. A data feature corresponding to each host is determined based on the session information corresponding to each host. The data feature corresponding to each host is used to describe behavior of each host accessing the one or more other hosts. The data feature corresponding to each host is trained according to the preset training method to generate the worm detection model.

The worm detection model may learn network behavior of each host in a network accessing one or more other hosts, and a successfully trained worm detection model can determine, based on network behavior of a host in the network, whether the host is worm-infected. Compared with a conventional technology, the worm detection method according to this embodiment of this application may be applicable to different networks, and have higher worm identification accuracy.

Optionally, in a possible implementation of the second aspect, the data feature corresponding to each host is determined in the following manner. The preset time period is divided into a plurality of time windows, and a time length of each of the plurality of time windows is the same as a time length of the first time window. Session information corresponding to one host is selected from the session information corresponding to each of the at least two hosts, and data features corresponding to the selected host in the plurality of time windows are obtained respectively by using the following steps, until the session information corresponding to each of the at least two hosts is processed, so as to obtain data features corresponding to each host in the plurality of time windows respectively. The following steps include allocating, based on start time of the session information corresponding to the selected host, the session information corresponding to the selected host to the plurality of time windows, to obtain session information corresponding to the selected host in the plurality of time windows respectively, determining, based on session information corresponding to the selected host in a third time window in the plurality of time windows, a data feature corresponding to the selected host in the third time window, and obtaining by analogy a data feature corresponding to the selected host in each of the plurality of time windows.

According to a third aspect, an embodiment of this application provides a network device. The network device includes a network interface, a memory, and a processor connected to the memory. The memory is configured to store instructions, and the processor is configured to execute the instructions, so that the network device performs the method in the first aspect or any one of the possible implementations of the first aspect, and the method in the second aspect or any one of the possible implementations of the second aspect. For details, refer to the foregoing detailed descriptions. Details are not repeated herein.

According to a fourth aspect, an embodiment of this application provides a worm detection apparatus. The apparatus has a function of implementing the method in the first aspect or any one of the possible implementations of the first aspect, and a function of implementing the method in the second aspect or any one of the possible implementations of the second aspect. The function may be implemented by hardware, or may be implemented by hardware executing corresponding software. The hardware or the software includes one or more modules corresponding to the function.

According to a fifth aspect, an embodiment of this application provides a computer storage medium, configured to store computer software instructions used by the foregoing network device. The computer storage medium includes a program designed for performing the first aspect, any one of the possible implementations of the first aspect, the second aspect, or any one of the possible implementations of the second aspect.

According to a sixth aspect, an embodiment of this application provides a computer program product including instructions. When the computer program product runs on a computer, the computer is enabled to perform the methods in the foregoing aspects.

According to a seventh aspect, an embodiment of this application provides a chip, including a memory and a processor. The memory is configured to store computer instructions, and the processor is configured to invoke and run the computer instructions from the memory, to perform the method in the first aspect or any one of the possible implementations of the first aspect, and the method in the second aspect or any one of the possible implementations of the second aspect.

DETAILED DESCRIPTION OF ILLUSTRATIVE EMBODIMENTS

Figure 1:
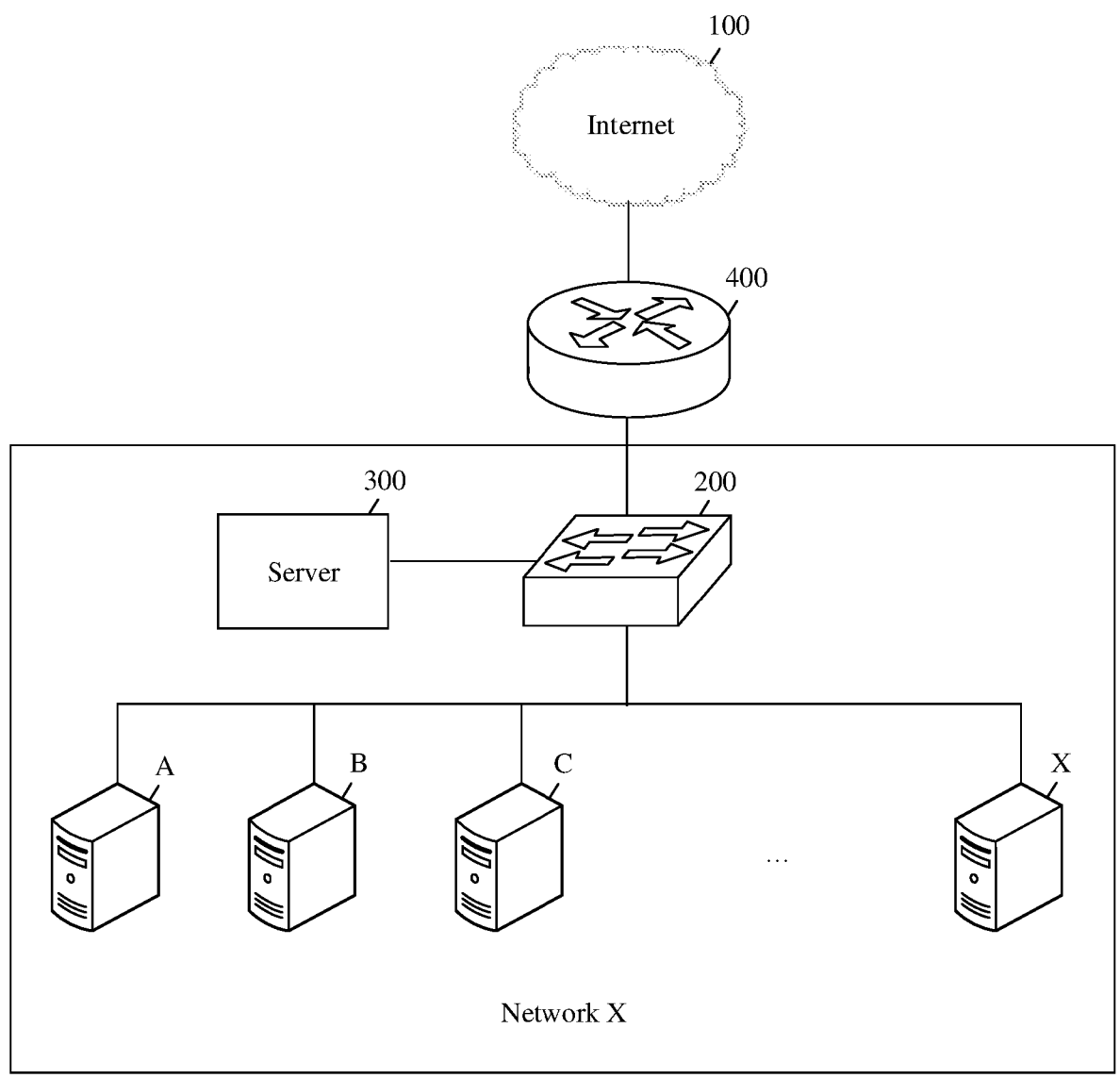
FIG. 1 is a schematic diagram of a network scenario to which a worm detection solution according to an embodiment of this application is applicable.

FIG. 1 is a schematic diagram of a network scenario to which a worm detection solution according to an embodiment of this application is applicable. The schematic diagram of the network scenario shown in FIG. 1 is a specific example of an applicable scenario of the worm detection solution according to this embodiment of this application. The applicable scenario of the worm detection solution according to this embodiment of this application is not limited to the example shown in FIG. 1.

The scenario shown in FIG. 1 includes a network X as an analysis object. Optionally, the network X is a network different from the Internet. For example, the network X is a local area network established by an organization such as an enterprise, a campus, or a home, or is a campus network (CAN) including a plurality of local area networks. The network X as an analysis object is connected to the Internet by using a gateway device 400. The network X includes at least one switch 200, a server 300, and a plurality of hosts. The plurality of hosts include a host A, a host B, a host C, a host X, and the like. The plurality of hosts may communicate with each other by using the switch 200, and the plurality of hosts may also connect to an Internet 100 by using the switch 200 and the gateway device 400. A plurality of switches may be included in the network X, and for brevity of illustration, at least one switch 200 is identified by using only one switch legend in FIG. 1. The switch 200 generates, based on data packets sent between the plurality of hosts in a historical time period, session information corresponding to each of the plurality of hosts.

The historical time period is relative to a current time, and refers to a period of time that has passed before the current time. The session information corresponding to each host that is generated by the switch 200 refers to session information of each host actively connecting to one or more other hosts in the plurality of hosts in the network X. For example, the historical time period is last month, and session information corresponding to the host A is session information of the host A actively connecting to the host B, the host C, the host X, and the like. It may be understood that, the "one or more other hosts" are one or more hosts in the network X other than the host that actively initiates the connection. The range of the "one or more other hosts" varies with different hosts. For example, for the host A, the one or more other hosts include hosts such as the host B, the host C, and the host X, while for the host B, the one or more other hosts include hosts such as the host A, the host C, and the host X.

In the embodiment shown in FIG. 1, the server 300 may obtain, from the switch 200, the session information corresponding to each of the plurality of hosts in the network X in a preset time period in the historical time period. Then, the server 300 may determine, based on the session information corresponding to each host, a data feature corresponding to each host. Then, the server 300 may train, according to a preset training method, the data feature corresponding to each host in the network X, to generate a worm detection model. Finally, the server 300 may detect worm-infected hosts in the plurality of hosts in the network X in a current time window by using the worm detection model, and determine a worm propagation chain based on a network behavior similarity between the worm-infected hosts.

The preset time period may be a time period that is set in advance and that has passed before the current time. For example, the historical time period is last month, and the preset time period is last 10 days. Certainly, the preset time period may be set based on an actual situation. In this embodiment of this application, a time length of the preset time period is not limited, and a manner of selecting the preset time period from the historical time period is not limited.

For example, if the current time is 10:00 on Oct. 31, 2019, and the historical time period is from 00:00 on Oct. 1, 2019 to 00:00 on Oct. 31, 2019, the preset time period may be set to from 00:00 on Oct. 21, 2019 to 00:00 on Oct. 31, 2019.

Figure 2:
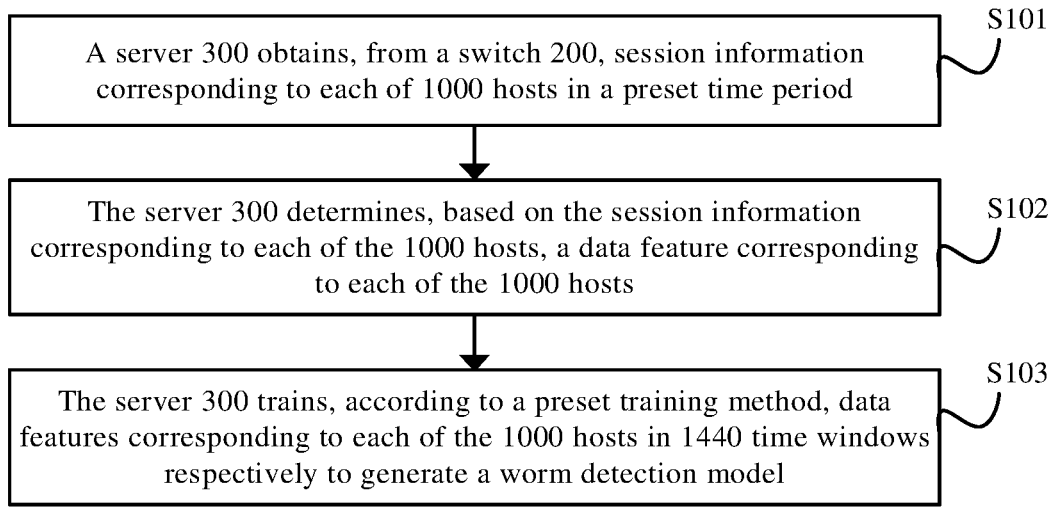
FIG. 2 is a flowchart of a worm detection method according to an embodiment of this application.

Refer to FIG. 1 and FIG. 2. FIG. 2 is a flowchart of a worm detection method according to an embodiment of this application. The worm detection method shown in FIG. 2 may be applied to the network scenario shown in FIG. 1. In the network scenario shown in FIG. 1, it is assumed that 1000 hosts are included in the network X in FIG. 1. The following describes how to use session information of the 1000 hosts in the network X to generate a worm detection model. The worm detection method according to this embodiment of this application includes the following steps S101 to S103.

S101. The server 300 obtains, from the switch 200, session information corresponding to each of the 1000 hosts in the network X in a preset time period.

Table 1 is an example table of the session information corresponding to each of the 1000 hosts in the network X in the preset time period.

TABLE 1

| Host name | IP address of a host | Session information corresponding to the host |
|---|---|---|
| Host A | 192.168.0.1 | Information about a session 1, information about a session 2, . . . , information about a session m |
| Host B | 192.168.0.2 | Information about a session 1, information about a session 2, . . . , information about a session n |
| Host C | 192.168.0.3 | Information about a session 1, information about a session 2, . . . , information about a session o |
| . . . | . . . | . . . |
| Host X | 192.168.4.100 | Information about a session 1, information about a session 2, . . . , information about a session p |

For example, in Table 1, an internet protocol (IP) address of the host A is 192.168.0.1, and session information corresponding to the host A includes information about 10,000 sessions, such as the information about the session 1, the information about the session 2, and the information about the session m. The session information corresponding to the host A is session information of the host A actively connecting to a host other than the host A in the 1000 hosts in the network X.

The session information corresponding to each host includes information about a plurality of sessions corresponding to each host. Information about each session in information about at least two sessions corresponding to each host includes at least one of a 5-tuple of the session, a byte of the session, a packet quantity of the session, a transmission control protocol (TCP) flag of the session, start time of the session, or end time of the session.

For example, the session information of the host A includes information about 10,000 sessions, such as the information about the session 1, the information about the session 2, and the information about the session m. The information about the session 1 includes a 5-tuple of the session 1, a byte of the session 1, a packet quantity of the session 1, a transmission control protocol flag of the session 1, start time of the session 1, and end time of the session 1.

Specifically, the 5-tuple of the session 1 includes a source IP address (192.168.0.1), a source port number (10), a destination IP address (192.168.0.2), a destination port number (8080), and a protocol type (transmission control protocol (TCP) protocol). The bytes quantity of the session 1 are 20 MB, the packet quantity of the session 1 is 100, the transmission control protocol flag of the session 1 is "SYN=1", the start time of the session 1 is 00:02 on Oct. 21, 2019, and the end time of the session 1 is 00:08 on Oct. 21, 2019.

S102. The server 300 determines, based on the session information corresponding to each of the 1000 hosts in the network X, a data feature corresponding to each of the 1000 hosts in the network X.

The data feature corresponding to each host is used to describe behavior of each host accessing the one or more other hosts. For example, the data feature corresponding to each host includes at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments. The total packet byte quantity is a sum of the request-packet byte quantity and a response-packet byte quantity. The quantity of all sessions is a sum of the quantity of short sessions and a quantity of common sessions.

The quantity of hosts whose port is scanned is a maximum quantity of different hosts on which a same destination port is accessed by the first host. The short session is a session whose ratio of a byte quantity of the session to a packet quantity of the session is less than a threshold. The common session is a session whose ratio of a byte quantity of the session to a packet quantity of the session is greater than or equal to the threshold. For example, the threshold is 60. Certainly, parameters included in the data feature according to this embodiment of this application are not limited to the provided embodiments. A person skilled in the art may add or delete some parameters in the data feature.

For example, a data feature corresponding to the host A includes a quantity of hosts whose port is scanned that is corresponding to the host A, a percentage of a request-packet byte quantity in a total packet byte quantity that is corresponding to the host A, a quantity of short sessions that is corresponding to the host A, a percentage of the quantity of short sessions in a quantity of all sessions that is corresponding to the host A, and a quantity of connected network segments that is corresponding to the host A.

In the embodiment described in FIG. 2 of this application, a network device such as the server 300 trains a worm detection model by pre-learning network behavior of each host in a network accessing one or more other hosts, then determines, based on the worm detection model and network behavior of a host in the network, whether the host is worm-infected, and generates a prediction result for indicating whether the first host is worm-infected. The worm detection method according to this embodiment of this application may be applicable to different networks. In other words, a corresponding worm detection model is trained based on network behavior of hosts on each different network. Compared with a conventional technology of detecting and determining worm infection by using a same threshold for all networks without distinction, this method can reduce a false positive rate to some extent, thereby improving worm identification accuracy.

The following describes how to determine, based on the session information corresponding to each of the 1000 hosts in the network X, the data feature corresponding to each of the 1000 hosts in the network X. In other words, S102 includes the following steps S1021 to S1025.

S1021. The server 300 divides the preset time period into a plurality of time windows.

Figure 3:
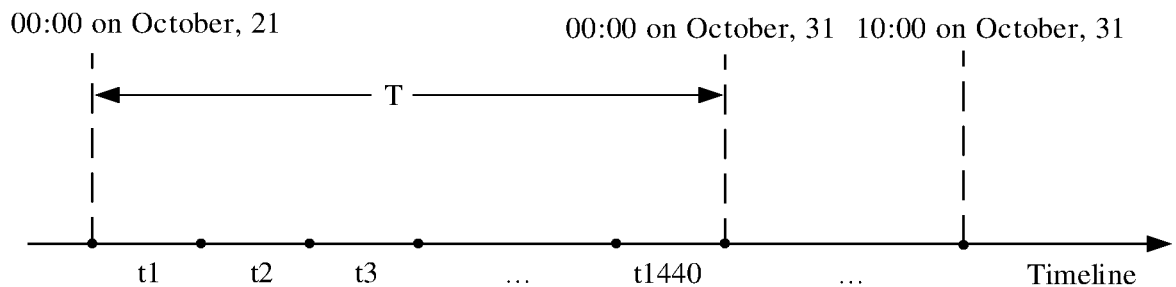
FIG. 3 is a schematic diagram of a preset time period and a plurality of time windows according to an embodiment of this application.

FIG. 3 is a schematic diagram of the preset time period and the plurality of time windows according to this embodiment of this application. For example, if the preset time period is last 10 days, a time length of each time window is 10 minutes, and the current time is 10:00 on Oct. 31, 2019, the preset time period is from 00:00 on Oct. 21, 2019 to 00:00 on Oct. 31, 2019. Then, the 10 days can be split into 1440 time windows.

S1022. The server 300 selects, from the session information corresponding to each of the 1000 hosts in the network X, session information corresponding to the host A.

It is assumed that the session information corresponding to the host A includes information about 10,000 sessions, and the information about each session includes start time of the session. For the session information corresponding to the host A, refer to the first row of data in Table 1.

S1023. The server 300 allocates, based on the start time of the session information corresponding to the host A, the session information corresponding to the host A to the 1440 time windows, to obtain session information corresponding to the host A in the 1440 time windows respectively.

Table 2 is a table of mapping relationships between the 1440 time windows and the information about the 10,000 sessions of the host A.

TABLE 2

| Time window | Session information of the host A |
|---|---|
| t1 | Information about a session 1, . . . , information about a session 10 |
| t2 | Information about a session 11, . . . , information about a session 20 |
| t3 | Information about a session 21, . . . , information about a session 50 |
| . . . | . . . |
| t1440 | Information about a session 9990, . . . , information about a session 10000 |

For example, in Table 2, it is assumed that the time window t1 corresponds to the information about the sessions 1 to 10 of the host A, the time window t2 corresponds to the information about the sessions 11 to 20 of the host A, the time window t3 corresponds to the information about the sessions 21 to 50 of the host A, and the time window t1440 corresponds to the information about the sessions 9990 to 10000 of the host A.

Specifically, with reference to Table 2, if the time window t1 is from 00:00 on Oct. 1, 2019 to 00:10 on Oct. 1, 2019, and start time of the sessions 1 to 10 all falls within the time window t1, the information about the sessions 1 to 10 of the host A is allocated to the time window t1, so that the time window t1 corresponds to the information about the sessions 1 to 10 of the host A separately.

Certainly, if the host A does not establish a session with any other hosts in some time windows, the host A does not have a corresponding session in these time windows.

S1024. The server 300 determines, based on the session information corresponding to the host A in the 1440 time windows respectively, data features corresponding to the host A in the 1440 time windows respectively.

Table 3 is a table of mapping relationships between the 1440 time windows, the session information of the host A, and the data features of the host A.

TABLE 3

| Time window | Session information of the host A | Data feature of the host A |
|---|---|---|
| t1 | Information about a session 1, . . . , information about a session 10 | Data feature A1 |
| t2 | Information about a session 11, . . . , information about a session 20 | Data feature A2 |
| t3 | Information about a session 21, . . . , information about a session 50 | Data feature A3 |
| . . . | . . . | |
| t1440 | Information about a session 9990, . . . , information about a session 10000 | Data feature A1440 |

In Table 3, if the time window t1 corresponds to the information about the sessions 1 to 10 of the host A, the server 300 determines, based on the information about the sessions 1 to 10 corresponding to the host A in the time window t1, a data feature 1 corresponding to the host A in the time window t1.

With reference to Table 3, the data feature 1 corresponding to the host A in the time window t1 includes a quantity of hosts whose port "8080" is scanned that is corresponding to the host A is "9", a percentage of a request-packet byte quantity in a total packet byte quantity that is corresponding to the host A is "90%", a quantity of short sessions that is corresponding to the host A is "9", a percentage of the quantity of short sessions in a quantity of all sessions that is corresponding to the host A is "90%", and a quantity of connected network segments that is corresponding to the host A is "5".

For example, with reference to Table 3, the information about the sessions 1 to 10 corresponding to the host A in the time window t1 means that the host A accesses 10 hosts in total in the time window t1 and that the 10 hosts have different IP addresses. In addition, ports of nine hosts accessed by the host A in the time window t1 are all "8080", and a port of one host accessed by the host A in the time window t1 is "10". Therefore, of the 10 different hosts, a quantity of different hosts on which the same destination port "8080" is accessed by the host A is 9.

For example, with reference to Table 3, the information about the sessions 1 to 10 corresponding to the host A in the time window t1 means that the 10 sessions include 90 request packets and 10 response packets, that the 90 request packets have 90 MB, and that the 10 response packets have 10 MB. Therefore, the percentage of the request-packet byte quantity in the total packet byte quantity that is corresponding to the host A is equal to bytes quantity of the 90 request packets divided by a sum of the bytes quantity of the 90 request packets and bytes quantity of the 10 response packets, to 90 MB divided by a sum of 90 MB and 10 MB, and to 90%. "All packets" refers to a sum of a request packet and a response packet.

For example, with reference to Table 3, the information about the sessions 1 to 10 corresponding to the host A in the time window t1 means that the 10 sessions include 9 short sessions and 1 common session. Then, the quantity of short sessions is 9.

For example, with reference to Table 3, the information about the sessions 1 to 10 corresponding to the host A in the time window t1 means that the 10 sessions include 9 short sessions and 1 common session. The percentage of the quantity of short sessions in the quantity of all sessions is equal to the quantity of short sessions divided by a sum of the quantity of short sessions and the quantity of common sessions, to 9 divided by a sum of 9 and 1, and to 90%. "All sessions" refers to a sum of a quantity of short sessions and a quantity of common sessions.

For example, with reference to Table 3, the information about the sessions 1 to 10 that is corresponding to the host A in the time window t1 means that 10 destination IP addresses corresponding to the information about the 10 sessions come from five network segments. The five network segments are 192.168.0.XXX, 192.168.1.XXX, 192.168.2.XXX, 192.168.3.XXX, and 192.168.4.XXX.

S1025. The server 300 separately performs S1022 to S1024 on session information corresponding to the other hosts in the 1000 hosts in the network X, to finally obtain data features corresponding to each of the 1000 hosts in the network X in the 1440 time windows respectively.

Table 4 is a table of mapping relationships between the 1440 time windows and the data features of the 1000 hosts in the network X.

TABLE 4

|  | Host A | Host B | ... | Host X |
|---|---|---|---|---|
| Time window t1 | Data feature A1 | Data feature B1 | ... | Data feature X1 |
| Time window t2 | Data feature A2 | Data feature B2 | ... | Data feature X2 |
| Time window t3 | Data feature A3 | Data feature B3 | ... | Data feature X3 |
| ... | ... | ... | ... | ... |
| Time window t1440 | Data feature A1440 | Data feature B1440 | ... | Data feature X1440 |

For example, with reference to Table 4, the 1000 hosts in the network X may have a maximum of 1,440,000 data features in the 1440 time windows by multiplying 1000 hosts by 1440 data features. Certainly, in some time windows, if the host does not have session information, there is no data feature. Therefore, in actual cases, a quantity of finally obtained data features may be less than 1,440,000.

S103. The server 300 trains, according to a preset training method, the data features corresponding to each of the 1000 hosts in the network X in the 1440 time windows respectively, to generate a worm detection model.

The preset training method is a training method that is set in advance. For example, the preset training method may be an isolation forest anomaly detection method. Certainly, this embodiment of this application is not limited to the isolation forest anomaly detection method, and may alternatively use another type of training method.

For example, with reference to Table 4, the server 300 trains the data in Table 4 by using the isolation forest anomaly detection method to generate the worm detection model. It is assumed that the data feature corresponding to each host includes the quantity of hosts whose port is scanned, the percentage of a request-packet byte quantity in a total packet byte quantity, the quantity of short sessions, the percentage of the quantity of short sessions in a quantity of all sessions, and the quantity of connected network segments.

Table 5 is a table of mapping relationships between data features and data ranges of the 1000 hosts in the network X.

TABLE 5

| Data feature | Data range 1 | Data range 2 |
|---|---|---|
| Quantity of hosts whose port is scanned | 8 to 12 | 4 to 6 |
| Percentage of a request-packet byte quantity in a total packet byte quantity | 90% to 100% | 40% to 60% |
| Quantity of short sessions | 8 to 12 | 4 to 6 |
| Percentage of the quantity of short sessions in a quantity of all sessions | 90% to 100% | 40% to 60% |
| Quantity of connected network segments | 5 to 10 | 1 or 2 |

For example, with reference to Table 5, if 10% of the data features of the 1000 hosts in the network X fall within the data range 1, and 90% of the data features fall within the data range 2, an abnormal data feature generated by a worm-infected host falls within the data range 1, and a normal data feature generated by a worm-uninfected host falls within the data range 2.

The server 300 trains the data in Table 4 by using the isolation forest anomaly detection method to generate the worm detection model, in other words, after the worm detection model learns the data features in Table 4, a rule shown in Table 5 can be obtained. If the data feature of the host A in the time window t1 falls within the data range 1 in Table 5, the host A has a worm-infected behavior feature, and the host A is more likely a worm-infected host. If the data feature of the host B in the time window t1 falls within the data range 2 in Table 5, the host B does not have a worm-infected behavior feature, and the host B is more likely a worm-uninfected host.

Certainly, a successfully trained worm detection model may not store the data in Table 5, and data in the successfully trained worm detection model may exist in another form. However, the successfully trained worm detection model can identify whether a data feature of a host falls within a normal range. If yes, that is, if the data feature of the host falls within the data range 2, the worm detection model can determine that the host is more likely worm-uninfected. If not, that is, if the data feature of the host falls within the data range 1, the worm detection model can determine that the host is more likely worm-infected.

In embodiments shown in FIG. 1 to FIG. 3, the worm detection model may learn network behavior of each host in a network accessing one or more other hosts, and a successfully trained worm detection model can determine, based on network behavior of a host in the network, whether the host is worm-infected. Compared with a conventional technology, the worm detection method according to this embodiment of this application may be applicable to different networks, and have higher worm identification accuracy.

For example, an enterprise A has 500 hosts in an intranet 1 and an enterprise B has 2000 hosts in an intranet 2. It is assumed that the enterprise A can obtain a worm detection model X by learning network behavior of the 500 hosts in the intranet 1 by using the method shown in FIG. 2, and the enterprise B can obtain a worm detection model Y by learning network behavior of the 2000 hosts in the intranet 2 by using the method shown in FIG. 2. Because a service type of the enterprise A is different from a service type of the enterprise B, the network behavior of the 500 hosts in the intranet 1 is different from the network behavior of the 2000 hosts in the intranet 2. Consequently, the worm detection model X and the worm detection model Y have different criteria for determining whether a host is worm-infected. Therefore, the worm detection method according to this embodiment of this application may be applicable to different types of networks. Moreover, the worm detection model can learn, based on historical data of the network, which network behavior is network behavior that is determined as "worm-infected" in the historical data and which network behavior is network behavior that is determined as "worm-uninfected" in the historical data. Therefore, the worm detection method according to this embodiment of this application can more accurately identify a worm-infected host.

Figure 4:
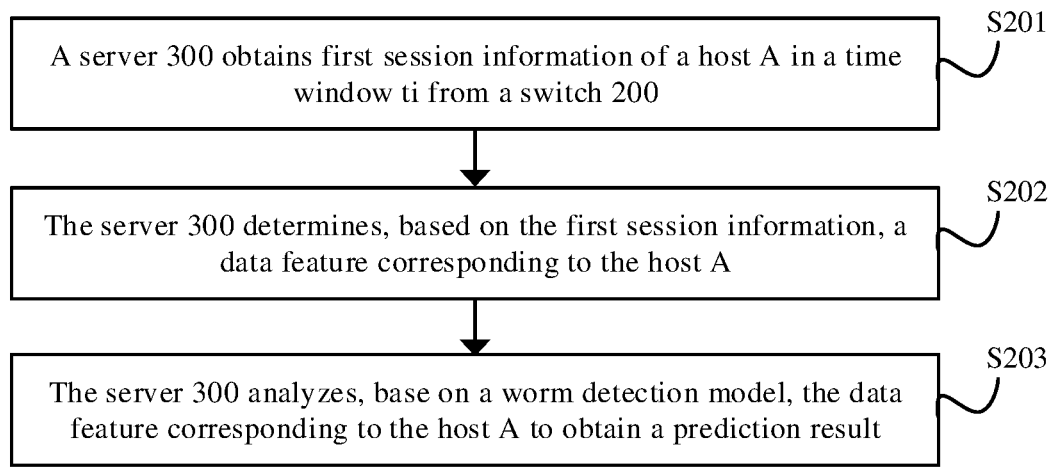
FIG. 4 is a flowchart of another worm detection method according to an embodiment of this application.

Refer to FIG. 1 and FIG. 4. FIG. 4 is a flowchart of another worm detection method according to an embodiment of this application. The worm detection method shown in FIG. 4 may be applied to the network scenario shown in FIG. 1. In the example shown in FIG. 4, a quantity of hosts in the network X in FIG. 1 is 1000. The following describes how the worm detection model generated by the embodiment shown in FIG. 2 is used to identify whether the host A is worm-infected. The worm detection method according to this embodiment of this application includes the following steps S201 to S203.

S201. The server 300 obtains first session information of the host A in a time window ti from the switch 200.

The first session information is session information of the host A actively connecting to one or more other hosts in the time window ti. The first session information includes information about at least two sessions. Information about each session in the information about the at least two sessions includes at least one of a 5-tuple of the session, a byte of the session, a packet quantity of the session, a transmission control protocol flag of the session, start time of the session, or end time of the session.

Table 6 is an example table of the first session information corresponding to the host A in the time window ti.

TABLE 6

| Time window | Host name | IP address of a host | First session information corresponding to the host A |
|---|---|---|---|
| ti | Host A | 192.168.0.1 | Information about a session 1, . . . , information about a session 10 |

For example, in Table 6, an IP address of the host A is 192.168.0.1, and the first session information of the host A in the time window ti includes the information about the sessions 1 to 10. The information about the session 1 includes a 5-tuple of the session 1, a byte of the session 1, a packet quantity of the session 1, a transmission control protocol flag of the session 1, start time of the session 1, and end time of the session 1.

Specifically, the 5-tuple of the session 1 includes a source IP address (192.168.0.1), a source port number (1000), a destination IP address (192.168.0.78), a destination port number (2000), and a protocol type (TCP protocol). The bytes quantity of the session 1 are 50 MB, the packet quantity of the session 1 is 200, the transmission control protocol flag of the session 1 is "SYN=1", the start time of the session 1 is 10:00 on Oct. 31, 2019, and the end time of the session 1 is 10:10 on Oct. 31, 2019.

Figure 5:
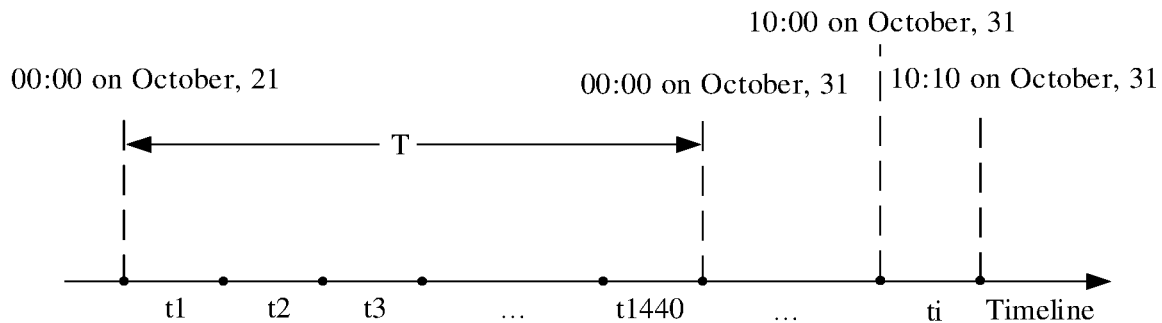
FIG. 5 is a schematic diagram of a preset time period and a time window ti according to an embodiment of this application.

FIG. 5 is a schematic diagram of a preset time period and the time window ti according to this embodiment of this application. In FIG. 5, a preset time period T is from 00:00 on Oct. 21, 2019 to 00:00 on Oct. 31, 2019, the preset time period includes 1440 time windows, and a time length of each of the 1440 time windows is 10 minutes. The time window ti is from 10:00 on Oct. 31, 2019 to 10:10 on Oct. 31, 2019, and a time length of the time window ti is 10 minutes.

Based on embodiments shown in FIG. 1 to FIG. 3, it can be learned that, by using an isolation forest anomaly detection method, the server 300 trains data features corresponding to each of the 1000 hosts included in the network X in 1440 time windows respectively, to generate a worm detection model. With reference to FIG. 5, after the worm detection model is obtained, the server 300 may obtain, from the switch 200, the first session information of the host A in the time window ti, and the server 300 determines, based on the first session information, a data feature corresponding to the host A, and then analyzes, based on the worm detection model, the data feature corresponding to the host A to obtain a prediction result.

S202. The server 300 determines, based on the first session information, a data feature corresponding to the host A.

The data feature corresponding to the host A is used to describe behavior of the host A accessing the one or more other hosts. The data feature corresponding to the host A includes at least one of a maximum quantity of different hosts on which a same destination port accessed by the host A, a percentage of a request-packet byte quantity in a total packet byte quantity, a quantity of short sessions, a percentage of the quantity of short sessions in a quantity of all sessions, or a quantity of connected network segments.

For example, the data feature corresponding to the host A includes a maximum quantity "10" of hosts on which a same destination port accessed by the host A, a percentage "98%" of a request-packet byte quantity in a total packet byte quantity that is corresponding to the host A, a quantity "9" of short sessions that is corresponding to the host A, a percentage "90%" of the quantity of short sessions in a quantity of all sessions that is corresponding to the host A, and a quantity "8" of connected network segments that is corresponding to the host A.

S203. The server 300 analyzes, based on the worm detection model, the data feature corresponding to the host A, to obtain a prediction result.

Embodiments shown in FIG. 1 to FIG. 3 describe how to generate the worm detection model. For a worm detection model generation process, refer to embodiments shown in FIG. 1 to FIG. 3.

The prediction result is used to indicate whether the host A is worm-infected, and the prediction result may be displayed in different forms. For example, the prediction result may be a prediction score between [−1, 1]. If the prediction score is between [−1, 0], the host A may have been worm-infected. If the prediction score is between [0, 1], the host A may be worm-uninfected. A smaller score indicates a higher probability that the host A is worm-infected. A larger score indicates a lower probability that the host A is worm-infected.

For example, the example of the data feature corresponding to the host A and the content shown in Table 5 indicate that the data feature of the host A falls within the data range 1 in Table 5. Therefore, the host A has a worm-infected behavior feature, and the host A is more likely a worm-infected host. It is assumed that the prediction result is −0.5, the host A may have been worm-infected.

In embodiments shown in FIG. 1 and FIG. 4, the worm detection model may determine, based on a data feature of a host in one time window, whether the host is worm-infected. Certainly, the worm detection model may determine a worm-infected host and a worm-uninfected host in a plurality of hosts based on data features of the plurality of hosts in one time window.

Figure 6:
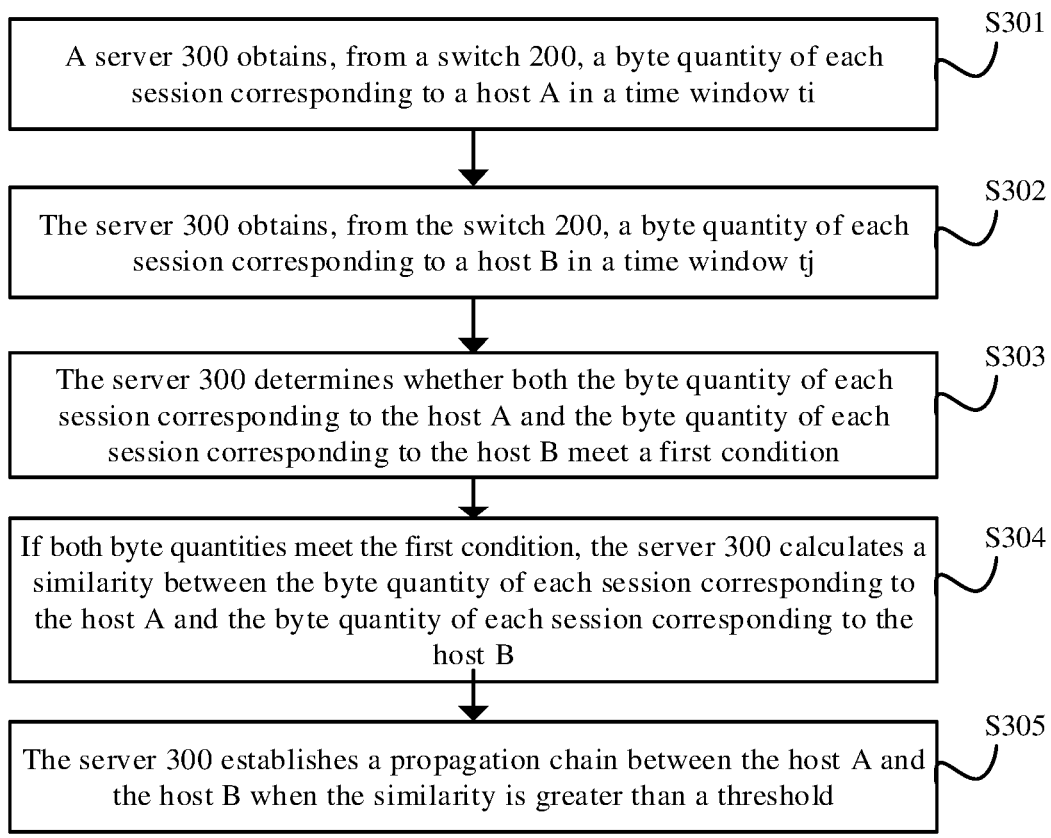
FIG. 6 is a flowchart of still another worm detection method according to an embodiment of this application.

Refer to FIG. 1 and FIG. 6. FIG. 6 is a flowchart of still another worm detection method according to an embodiment of this application. The worm detection method shown in FIG. 6 may be applied to the network scenario shown in FIG. 1. In the example shown in FIG. 6, it is assumed that a quantity of hosts in FIG. 1 is 1000. The worm detection model generated in the embodiment shown in FIG. 2 detects, among the 1000 hosts in the network X, that both the host A and the host B are worm-infected. The following describes how to establish a worm propagation chain between the host A and the host B by using examples of the host A and the host B. The worm detection method according to this embodiment of this application includes the following steps S301 to S305.

S301. The server 300 obtains, from the switch 200, a byte quantity of each session corresponding to the host A in a time window ti.

S302. The server 300 obtains, from the switch 200, a byte quantity of each session corresponding to the host B in a time window tj.

In S301 and S302, each session corresponding to the host A is a session generated when the host A actively connects to another host, and each session corresponding to the host B is a session generated when the host B actively connects to another host. In addition, the host B is a host to which the host A actively connect in the time window ti.

Table 7 is an example table of byte quantities of sessions corresponding to the host A and byte quantities of sessions corresponding to the host B respectively.

TABLE 7

| Host | Session | Byte quantity of a session |
| --- | --- | --- |
| Host A | Session A1 | 200 KB |
| | ... | ... |
| | Session A10 | 1200 KB |
| Host B | Session B1 | 180 KB |
| | ... | ... |
| | Session B10 | 1100 KB |

In Table 7, it is assumed that the host A has 10 sessions in the time window ti and the host B has 10 sessions in the time window tj.

Figure 7:
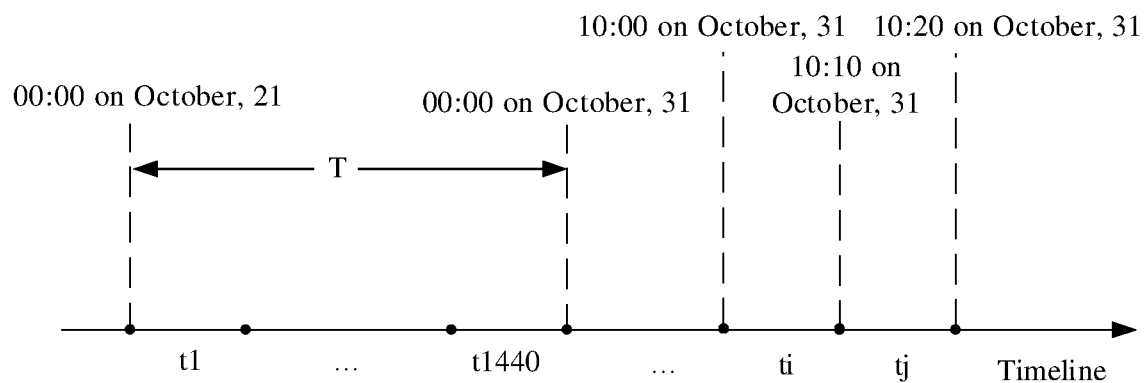
FIG. 7 is a schematic diagram of a preset time period, a time window ti, and a time window tj according to an embodiment of this application.

FIG. 7 is a schematic diagram of a preset time period, a time window ti, and a time window tj according to this embodiment of this application. In FIG. 7, a preset time period T is from 00:00 on Oct. 21, 2019 to 00:00 on Oct. 31, 2019, the preset time period includes 1440 time windows, and a time length of each of the 1440 time windows is 10 minutes. The time window ti is from 10:00 on Oct. 31, 2019 to 10:10 on Oct. 31, 2019, and the time window tj is from 10:10 on Oct. 31, 2019 to 10:20 on Oct. 31, 2019. Time lengths of both the time window ti and the time window tj are 10 minutes.

S303. The server 300 determines whether both the byte quantity of each session corresponding to the host A in the time window ti and the byte quantity of each session corresponding to the host B in the time window tj meet a first condition.

The first condition is used to describe a worm probe process and a worm load transfer process. Network behavior of a worm-infected host in a time window includes a worm probe process and a worm load transfer process. The worm probe process includes a port probe process and a vulnerability probe process. Among the three processes, in the port probe process, the host establishes the most sessions each with the least bytes. In the vulnerability probe process, the host establishes a relatively large quantity of sessions each with a relatively small quantity of bytes. In the load transfer process, the host establishes the least sessions each with the most bytes.

For example, the first condition is that a byte quantity of each session corresponding to a host falls in three byte ranges. A first byte range is from 0 to 200 bytes, a second byte range is from 200 bytes to 1000 bytes, and a third byte range is from 1000 bytes to 2000 bytes. If a byte quantity of each session corresponding to a host falls in the three byte ranges, the byte quantity of each session corresponding to the host meets the first condition.

For example, of the 10 sessions corresponding to the host A in the time window ti, if there are 6 sessions each with a byte quantity in the range of 0 to 200 bytes, 3 sessions each with a byte quantity in the range of 200 to 1000 bytes, and 1 session with a byte quantity in the range of 1000 to 2000 bytes, the byte quantities of the 10 sessions corresponding to the host A in the time window ti meet the first condition.

For example, of the 10 sessions corresponding to the host B in the time window tj, if there are 5 sessions each with a byte quantity in the range of 0 to 200 bytes, 3 sessions each with a byte quantity in the range of 200 to 1000 bytes, and 2 sessions each with a byte quantity in the range of 1000 to 2000 bytes, the byte quantities of the 10 sessions corresponding to the host B in the time window tj meet the first condition.

S304. If both the byte quantity of each session corresponding to the host A and the byte quantity of each session corresponding to the host B meet the first condition, the server 300 calculates a similarity between the byte quantity of each session corresponding to the host A in the time window ti and the byte quantity of each session corresponding to the host B in the time window tj.

The calculation of the similarity may be specifically calculation of a cosine similarity. Certainly, the similarity is not limited to a cosine similarity.

S305. The server 300 establishes a propagation chain between the host A and the host B when the similarity is greater than a threshold.

With reference to Table 7, it is assumed that the threshold is 0.6 and the server 300 calculates a cosine similarity between the byte quantities of the 10 sessions corresponding to the host A and the byte quantities of the 10 sessions corresponding to the host B. If the cosine similarity is greater than 0.6, the server 300 establishes a propagation chain between the host A and the host B.

In the embodiment shown in FIG. 6, start time of the time window ti corresponding to the host A is earlier than start time of the time window tj corresponding to the host B, the host A actively connects to the host B in the time window ti, and there is a high similarity between the byte quantity of each session corresponding to the host A and the byte quantity of each session corresponding to the host B. If the foregoing three conditions are met, the worm-infected host A probably propagates a worm virus to the host B. Therefore, a propagation chain can be established between the host A and the host B. A propagation chain can provide a user with richer and more intuitive information about worm propagation, helping accurately assess impact of a worm in a network intranet an infected host is located.

Figure 8:
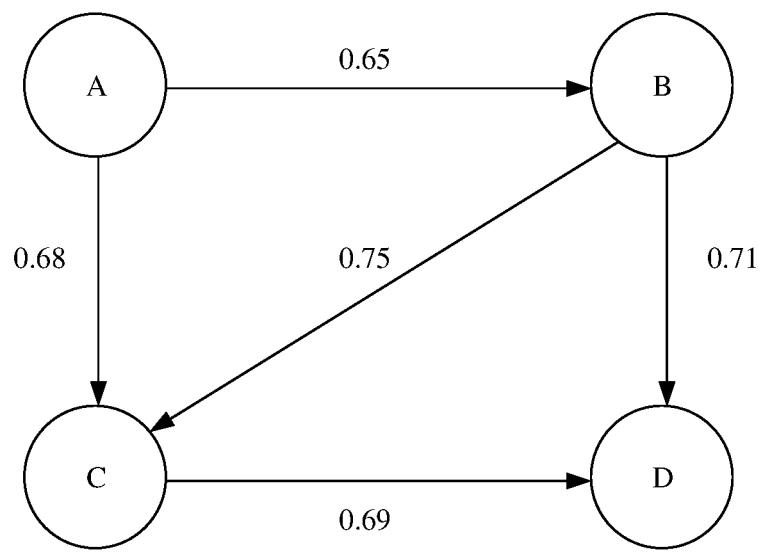
FIG. 8 is a schematic diagram of a worm propagation chain according to an embodiment of this application.

Refer to FIG. 1 and FIG. 8. FIG. 8 is a schematic diagram of a worm propagation chain according to an embodiment of this application. It is assumed that a quantity of hosts in the network X in FIG. 1 is 1000. After checking, the host A, the host B, the host C, and the host D in the 1000 hosts in the network X are determined as worm-infected.

In the embodiment shown in FIG. 8, it is assumed that the server 300 obtains, from the switch 200, a byte quantity of each session corresponding to the host A in a time window ti, a byte quantity of each session corresponding to the host B in a time window tj, a byte quantity of each session corresponding to the host C in a time window tm, and a byte quantity of each session corresponding to the host D in a time window tn. In addition, the host A actively connects to the host B and the host C in the time window ti, the host B actively connects to the host C and the host D in the time window tj, and the host C actively connects to the host D in the time window tm. Moreover, the byte quantity of each session corresponding to the host A, the byte quantity of each session corresponding to the host B, the byte quantity of each session corresponding to the host C, and the byte quantity of each session corresponding to the host D all meet the first condition.

Start time of the time window ti is earlier than start time of the time window tj, start time of the time window tm, and start time of the time window tn. The start time of the time window tj is earlier than the start time of the time window tm and the start time of the time window tn. The start time of the time window tm is earlier than the start time of the time window tn.

Table 8 is an example table of similarities between the host A, the host B, the host C, and the host D.

TABLE 8

| Relationship between hosts | Similarity |
|---|---|
| Host A and host B | 0.65 |
| Host A and host C | 0.68 |
| Host B and host C | 0.75 |
| Host B and host D | 0.71 |
| Host C and host D | 0.69 |

In Table 8, the network behavior similarity may be calculated in the manner provided by S304 and S305 in FIG. 6. Table 8 indicates that the host A probably propagates a worm virus to the host B and the host C, the host B probably propagates a worm virus to the host C and the host D, and the host C probably propagates a worm virus to the host D.

In the embodiment shown in FIG. 8, how to establish a worm propagation chain is illustrated by using examples of the host A, the host B, the host C, and the host D. Based on a propagation chain between two hosts, a propagation graph including several propagation chains can be further constructed. A propagation chain and a propagation graph can provide a user with richer and more intuitive information about worm propagation, helping accurately assess impact of a worm in a network intranet an infected host is located.

Figure 9:
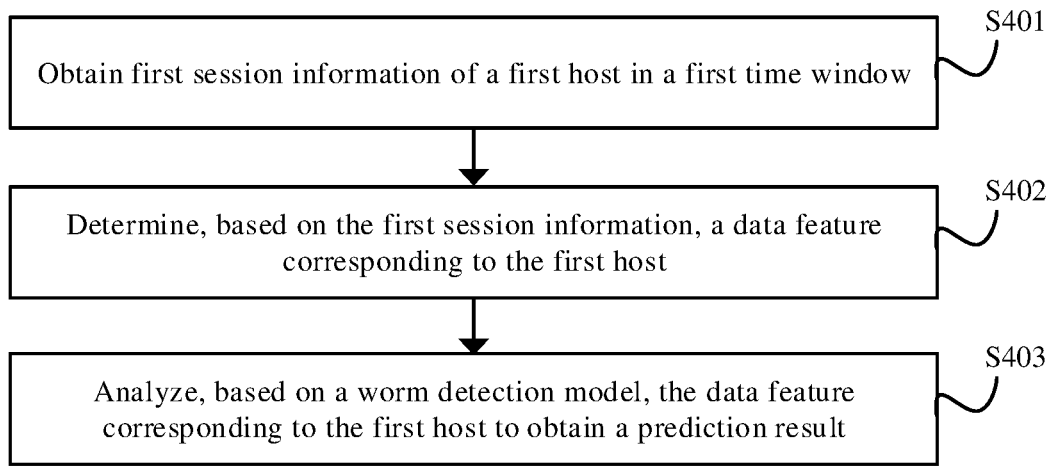
FIG. 9 is a flowchart of yet another worm detection method according to an embodiment of this application.

FIG. 9 is a flowchart of yet another worm detection method according to an embodiment of this application. The method shown in FIG. 9 includes the following steps S401 to S403.

S401. Obtain first session information of a first host in a first time window.

The first session information is session information of the first host actively connecting to one or more other hosts. The first session information includes information about at least two sessions. Information about each session in the information about the at least two sessions includes at least one of a 5-tuple of the session, a byte of the session, a packet quantity of the session, a transmission control protocol flag of the session, start time of the session, or end time of the session. In addition, the first time window is a time period with a preset length.

For specific implementation of S401, refer to the description of S201 in the embodiment shown in FIG. 4.

S402. Determine, based on the first session information, a data feature corresponding to the first host.

The data feature corresponding to the first host is used to describe behavior of the first host accessing the one or more other hosts. The data feature corresponding to the first host includes at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments.

For specific implementation of S402, refer to the description of S202 in the embodiment shown in FIG. 4.

S403. Analyze, based on a worm detection model, the data feature corresponding to the first host to obtain a prediction result.

The worm detection model is a model generated by training, by using a preset training method, data features corresponding to a plurality of hosts in a first network in which the first host is located. The prediction result is used to indicate whether the first host is worm-infected.

For specific implementation of S403, refer to the description of S203 in the embodiment shown in FIG. 4.

In the embodiment shown in FIG. 9, the worm detection model is a model generated by training, by using the preset training method, data features corresponding to a plurality of hosts in the first network in which the first host is located. Therefore, the worm detection model may accurately identify a worm-infected host and a worm-uninfected host in the first network based on data features of hosts in the first network.

Figure 10:
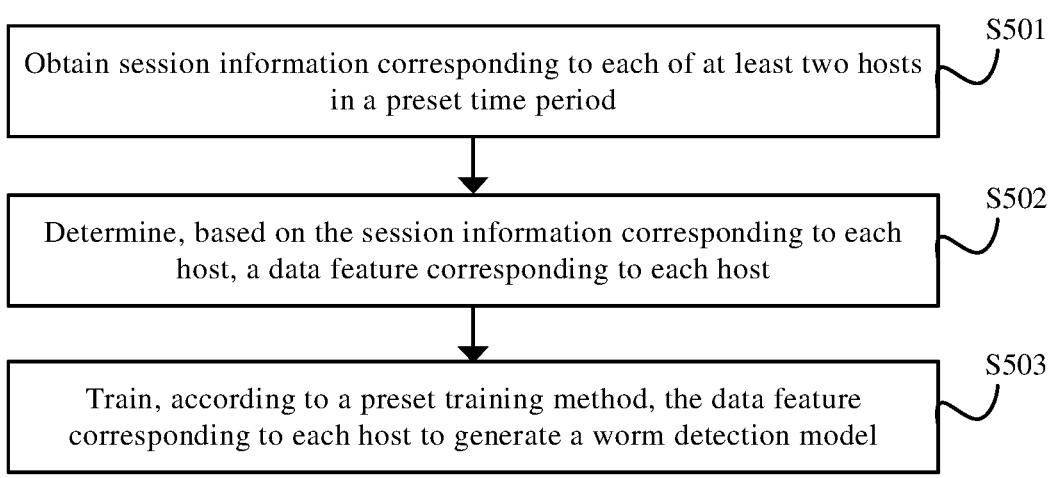
FIG. 10 is a flowchart of still yet another worm detection method according to an embodiment of this application.

FIG. 10 is a flowchart of still yet another worm detection method according to an embodiment of this application. The method shown in FIG. 10 includes the following steps S501 to S503.

S501. Obtain session information corresponding to each of at least two hosts in a preset time period.

The session information corresponding to each host is session information of each host actively connecting to one or more other hosts, and the at least two hosts are hosts in a first network. The session information corresponding to each host includes information about at least two sessions corresponding to each host. Information about each session in the information about the at least two sessions corresponding to each host includes at least one of a 5-tuple of the session, a byte of the session, a packet quantity of the session, a transmission control protocol flag of the session, start time of the session, or end time of the session.

For specific implementation of S501, refer to the description of S101 in the embodiment shown in FIG. 2.

S502. Determine, based on the session information corresponding to each host, a data feature corresponding to each host.

The data feature corresponding to each host is used to describe behavior of each host accessing the one or more other hosts. The data feature corresponding to each host includes at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments.

For specific implementation of S502, refer to the description of S102 in the embodiment shown in FIG. 2.

S503. Train, according to a preset training method, the data feature corresponding to each host to generate a worm detection model.

For specific implementation of S503, refer to the description of S103 in the embodiment shown in FIG. 2.

In the embodiment shown in FIG. 10, the worm detection model may learn network behavior of each host in a network accessing one or more other hosts, and a successfully trained worm detection model can determine, based on network behavior of a host in the network, whether the host is worm-infected. Compared with a conventional technology, the worm detection method according to this embodiment of this application may be applicable to different networks, and have higher worm identification accuracy.

In the embodiment shown in FIG. 10, S502 may further include the following steps, including dividing the preset time period into a plurality of time windows, where a time length of each of the plurality of time windows is the same as a time length of a first time window, and selecting, from the session information corresponding to each of the at least two hosts, session information corresponding to one host, and obtaining, by using the following steps, data features corresponding to the selected host in the plurality of time windows respectively until the session information corresponding to each of the at least two hosts is processed, so as to obtain data features corresponding to each host in the plurality of time windows respectively. The following steps include allocating, based on start time of the session information corresponding to the selected host, the session information corresponding to the selected host to the plurality of time windows, to obtain session information corresponding to the selected host in the plurality of time windows respectively, determining, based on session information corresponding to the selected host in a second time window in the plurality of time windows, a data feature corresponding to the selected host in the second time window, and obtaining by analogy a data feature corresponding to the selected host in each of the plurality of time windows.

For specific implementation of S502, refer to the description of S1021 to S1025 in the embodiment shown in FIG. 2.

Figure 11:
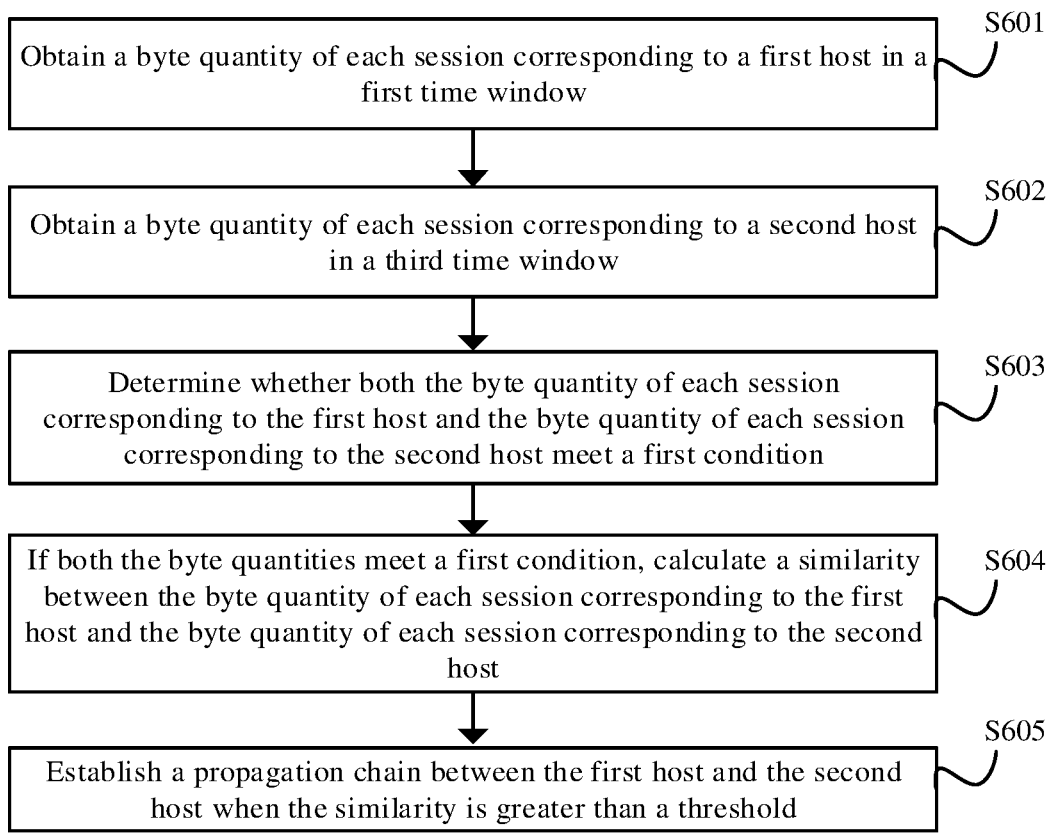
FIG. 11 is a flowchart of a further worm detection method according to an embodiment of this application.

FIG. 11 is a flowchart of a further worm detection method according to an embodiment of this application. The method shown in FIG. 11 includes the following steps S601 to S605.

S601. Obtain a byte quantity of each session corresponding to a first host in a first time window.

Each session corresponding to the first host is a session generated when the first host actively connects to another host.

For specific implementation of S601, refer to the description of S301 in the embodiment shown in FIG. 6.

S602. Obtain a byte quantity of each session corresponding to a second host in a third time window.

The second host is a host to which the first host actively connects in the first time window. The second host is a worm-infected host. Each session corresponding to the second host is a session generated when the second host actively connects to another host. A time length of the third time window is the same as a time length of the first time window. Start time of the first time window is earlier than or equal to start time of the third time window.

For specific implementation of S602, refer to the description of S302 in the embodiment shown in FIG. 6.

S603. Determine whether both the byte quantity of each session corresponding to the first host in the first time window and the byte quantity of each session corresponding to the second host in the third time window meet a first condition.

The first condition is used to describe a worm probe process and a worm load transfer process.

For specific implementation of S603, refer to the description of S303 in the embodiment shown in FIG. 6.

S604. If both the byte quantity of each session corresponding to the first host and the byte quantity of each session corresponding to the second host meet the first condition, calculate a similarity between the byte quantity of each session corresponding to the first host and the byte quantity of each session corresponding to the second host.

The similarity may be a cosine similarity.

For specific implementation of S604, refer to the description of S304 in the embodiment shown in FIG. 6.

S605. Establish a propagation chain between the first host and the second host when the similarity is greater than a threshold.

For specific implementation of S605, refer to the description of S305 in the embodiment shown in FIG. 6.

In the embodiment shown in FIG. 11, the start time of the first time window corresponding to the first host is earlier than the start time of the third time window corresponding to the second host, the first host actively connects to the second host in the first time window, and there is a high similarity between the byte quantity of each session corresponding to the first host and the byte quantity of each session corresponding to the second host. When the foregoing three conditions are met, the worm-infected first host probably propagates a worm virus to the second host, and therefore a propagation chain is established between the first host and the second host.

Figure 12:
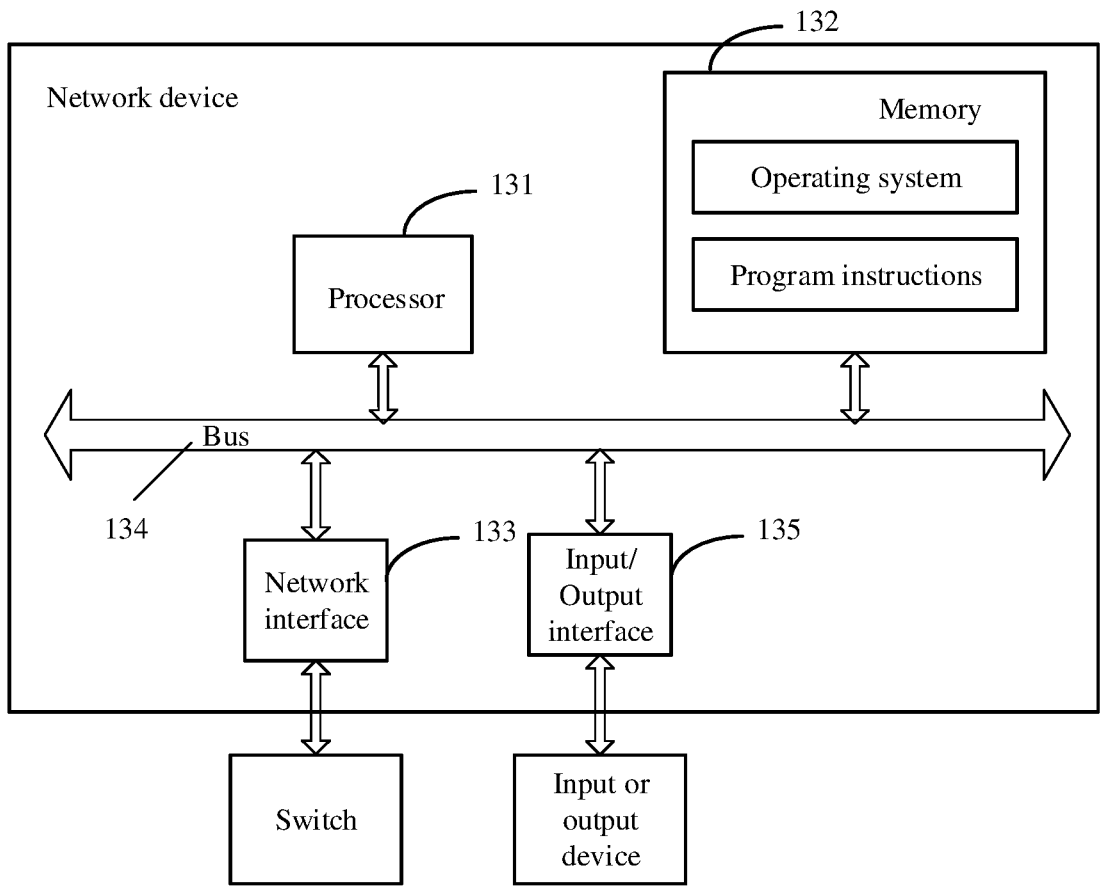
FIG. 12 is a schematic diagram of a structure of a network device according to an embodiment of this application.

Correspondingly, an embodiment of this application provides a network device, configured to perform the worm detection method according to the foregoing embodiments. FIG. 12 is a schematic diagram of a structure of a network device according to an embodiment of this application. Optionally, the network device shown in FIG. 12 is the server 300 in the application scenario shown in FIG. 1, and the network device shown in FIG. 12 is also the server 300 in the procedures shown in FIG. 2, FIG. 4, and FIG. 6. The network device includes a processor 131, a memory 132, and a network interface 133.

The processor 131 may be one or more central processing units (CPUs), and the CPU may be a single-core CPU, or may be a multi-core CPU.

The memory 132 includes but is not limited to a random access memory (RAM), a read-only memory (ROM), an erasable programmable read-only memory (EPROM), a flash memory, an optical memory, and the like. The memory 132 stores code of an operating system.

The network interface 133 may be a wired interface, for example, a fiber distributed data interface (FDDI) or a gigabit Ethernet (GE) interface. Alternatively, the network interface 133 may be a wireless interface. The network interface 133 is configured to receive a data flow from an internal network and/or an external network, and communicate with a switch in the internal network based on an indication of the processor 131.

Optionally, the processor 131 implements the method in the foregoing embodiments by reading instructions stored in the memory 132, or the processor 131 may implement the method in the foregoing embodiments by using internally stored instructions. When the processor 131 implements the method in the foregoing embodiments by reading the instructions stored in the memory 132, the memory 132 stores the instructions for implementing the method according to the foregoing embodiments of this application.

After the processor 131 executes the instructions stored in the memory 132, the network device is enabled to perform the following operations, including obtaining first session information of a first host in a first time window from a switch through the network interface 133, where the first session information is session information of the first host actively connecting to one or more other hosts, determining, based on the first session information, a data feature corresponding to the first host, where the data feature corresponding to the first host is used to describe behavior of the first host accessing the one or more other hosts, and analyzing, based on a worm detection model, the data feature corresponding to the first host to obtain a prediction result, where the worm detection model is a model generated by training, by using a preset training method, data features corresponding to a plurality of hosts in a first network in which the first host is located, and the prediction result is used to indicate whether the first host is worm-infected.

At least one processor 131 further performs the worm detection method in the foregoing method embodiments based on several correspondence tables (for example, Tables 1 to 8 in the foregoing embodiments) stored in the memory 132. For more details of implementing the foregoing functions by the processor 131, refer to descriptions in the foregoing method embodiments. Details are not repeated herein.

Optionally, the network device further includes a bus 134. The processor 131 and the memory 132 are usually connected to each other by using the bus 134, or may be connected to each other in another manner.

Optionally, the network device further includes an input/output interface 135. The input/output interface 135 is configured to connect to an output device, and output the prediction result to an administrator, so as to notify the administrator whether the first host is worm-infected, and the like. The output device includes but is not limited to a display, a printer, and the like.

The input/output interface 135 is further configured to connect to an input device. The input device includes but is not limited to a keyboard, a touchscreen, a microphone, and the like.

Figure 13:
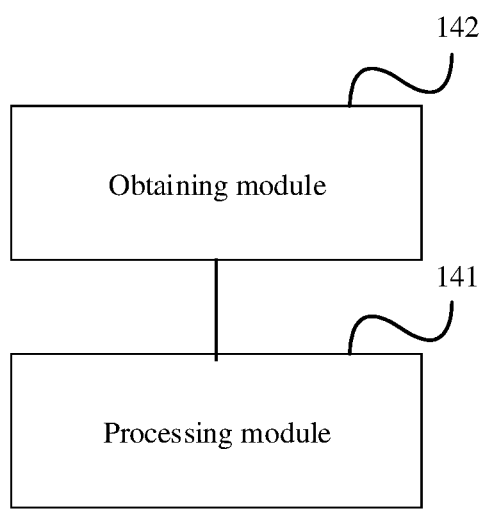
FIG. 13 is a schematic diagram of a structure of a worm detection apparatus according to an embodiment of this application.

FIG. 13 is a schematic diagram of a structure of a worm detection apparatus according to an embodiment of this application. The apparatus 14 includes a processing module 141 and an obtaining module 142. The apparatus 14 is coupled and connected to the network device in the foregoing method embodiments. For example, the apparatus 14 is integrated into the network device, and is a software or hardware component in the network device. The apparatus shown in FIG. 13 is applied to the scenario shown in FIG. 1 in the method embodiments, to implement functions of the server 300.

The obtaining module 142 is configured to obtain first session information of a first host in a first time window. The first session information is session information of the first host actively connecting to one or more other hosts.

The processing module 141 is configured to determine, based on the first session information, a data feature corresponding to the first host, where the data feature corresponding to the first host is used to describe behavior of the first host accessing the one or more other hosts, and analyze, based on a worm detection model, the data feature corresponding to the first host to obtain a prediction result, where the worm detection model is a model generated by training, by using a preset training method, data features corresponding to a plurality of hosts in a first network in which the first host is located, and the prediction result is used to indicate whether the first host is worm-infected.

For additional functions that can be implemented by the processing module 141 and the obtaining module 142 and more details of implementing the foregoing functions, refer to descriptions in the foregoing method embodiments. Details are not repeated herein.

The apparatus embodiment shown in FIG. 13 is merely an example. For example, the module division is merely logical function division and may be other division during actual implementation. For example, a plurality of modules or components may be combined or integrated into another system, or some features may be ignored or not performed. Function modules in embodiments of this application may be integrated into one processing module, or each of the modules may exist alone physically, or two or more modules are integrated into one module. The foregoing modules in FIG. 13 may be implemented in a form of hardware, or may be implemented in a form of a software function unit. For example, when software is used for implementation, the processing module 141 and the obtaining module 142 may be implemented by a software function module generated after the processor 131 in FIG. 12 reads the program code stored in the memory. Alternatively, the foregoing modules in FIG. 13 may be separately implemented by different hardware on a network device. For example, the obtaining module 142 is implemented by using the network interface 133 in FIG. 12, and the processing module 141 is implemented by using some processing resources (such as another core in the multi-core processor) in the processor 133 in FIG. 12, or a programmable device such as a field-programmable gate array (FPGA) or a coprocessor. Apparently, the foregoing function modules may be implemented by using a combination of software and hardware. For example, the obtaining module 142 is implemented by using the network interface 133, and the processing module 141 is a software function module generated after a CPU reads instructions stored in a memory.

For other additional functions that can be implemented by the apparatus in FIG. 13, a process of interaction with another network element device (such as an internal network device or a switch), technical effects that can be implemented by the apparatus, and more details of implementing the foregoing functions by the processing module 141 and the obtaining module 142, refer to the description about the network device in the foregoing method embodiments. Details are not repeated herein.

Embodiments in this specification are all described in a progressive manner. For same or similar parts in embodiments, refer to each other. Each embodiment focuses on a difference from other embodiments. Especially, a system embodiment is basically similar to a method embodiment, and therefore is described briefly. For related parts, refer to some descriptions in the method embodiment.

A person of ordinary skill in the art may understand that when the various aspects or possible implementations of the various aspects of embodiments of this application are implemented by using software, all or some of the foregoing aspects or possible implementations of the various aspects may be implemented in a form of a computer program product. The computer program product refers to computer-readable instructions stored in a computer-readable medium. When the computer instructions are loaded and executed on a computer, all or some of the procedure or functions according to embodiments of this application are generated.

The computer-readable medium may be a computer-readable signal medium or a computer-readable storage medium. The computer-readable storage medium includes but is not limited to an electronic, magnetic, optical, electromagnetic, infrared, or semiconductor system, device or apparatus, or any suitable combination thereof. For example, the computer-readable storage medium is a random access memory (RAM), a read only memory (ROM), an erasable programmable read only memory (EPROM), or a portable read only memory (Compact Disc Read-Only Memory, CD-ROM).

It is clear that a person skilled in the art can make various modifications and variations to the present invention without departing from the scope of the present invention. The present invention is intended to cover these modifications and variations provided that they fall within the scope of protection defined by the following claims.

What is claimed is:
1. A worm detection method, comprising:
obtaining first session information of a first host in a first time window, wherein the first session information is session information of the first host that is actively connecting to one or more other hosts, and the first session information comprises information about at least two sessions;
determining, based on the first session information, a data feature corresponding to the first host, wherein the data feature corresponding to the first host describes behavior of the first host accessing the one or more other hosts; and obtaining a prediction result by analyzing, based on a worm detection model, the data feature corresponding to the first host, wherein the worm detection model is a model generated by training, using a preset training method, data features corresponding to a plurality of hosts in a first network in which the first host is located, and wherein the prediction result indicates whether the first host is worm-infected, and wherein the data feature corresponding to the first host comprises a quantity of short sessions or a percentage of the quantity of short sessions in a quantity of the at least two sessions, wherein a short session is a session whose ratio of a byte quantity of the session to a packet quantity of the session is less than a threshold.

2. The worm detection method according to claim 1, wherein information about each session in the information about the at least two sessions comprises at least one of a 5-tuple of the session, a byte quantity of the session, a packet quantity of the session, a transmission control protocol flag of the session, a start time of the session, or an end time of the session; and wherein the data feature corresponding to the first host comprises at least one of a quantity of hosts whose port is scanned, a percentage of a request-packet byte quantity in a total packet byte quantity, or a quantity of connected network segments, and wherein the quantity of hosts whose port is scanned is a maximum quantity of different hosts on which a same destination port is accessed by the first host.

3. The worm detection method according to claim 1, further comprising performing, before the obtaining first session information:

obtaining session information corresponding to each host of at least two hosts in a preset time period, wherein the session information corresponding to each host is session information of each host actively connecting to one or more other hosts, and wherein the at least two hosts are hosts in the first network;

determining, based on the session information corresponding to each host, a data feature corresponding to each host, wherein the data feature corresponding to each host describes behavior of each host accessing the one or more other hosts; and training, according to the preset training method, the data feature corresponding to each host to generate the worm detection model.

4. The worm detection method according to claim 3, wherein the determining, based on the session information corresponding to each host, the data feature corresponding to each host comprises:

dividing the preset time period into a plurality of time windows, wherein a time length of each time window of the plurality of time windows is the same as a time length of the first time window; and selecting, from the session information corresponding to each of the at least two hosts, session information corresponding to one host; and obtaining data features corresponding to each host in the plurality of time windows respectively by obtaining data features corresponding to a selected host in the plurality of time windows respectively until the session information corresponding to each of the at least two hosts is processed, wherein the obtaining data features corresponding to the selected host comprises:

obtaining session information corresponding to the selected host in the plurality of time windows respectively by allocating, based on a start time of the session information corresponding to the selected host, the session information corresponding to the selected host to the plurality of time windows;

determining, based on session information corresponding to the selected host in a second time window in the plurality of time windows, a data feature corresponding to the selected host in the second time window; and obtaining, by analogy, a data feature corresponding to the selected host in each of the plurality of time windows.

5. The worm detection method according to claim 4, wherein the first session information comprises information about at least two sessions, and wherein information about each session in the information about the at least two sessions comprises at least one of a 5-tuple of the session, a byte quantity of the session, a packet quantity of the session, a transmission control protocol flag of the session, a start time of the session, or an end time of the session; and wherein the data feature corresponding to the first host comprises at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments, wherein the quantity of hosts whose port is scanned is a maximum quantity of different hosts on which a same destination port is accessed by the first host, and wherein the short session is a session whose ratio of a byte quantity of the session to a packet quantity of the session is less than a threshold.

6. The worm detection method according to claim 3, wherein the first session information comprises information about at least two sessions, and wherein information about each session in the information about the at least two sessions comprises at least one of a 5-tuple of the session, a byte quantity of the session, a packet quantity of the session, a transmission control protocol flag of the session, a start time of the session, or an end time of the session; and wherein the data feature corresponding to the first host comprises at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments, wherein the quantity of hosts whose port is scanned is a maximum quantity of different hosts on which a same destination port is accessed by the first host, and wherein the short session is a session whose ratio of a byte quantity of the session to a packet quantity of the session is less than a threshold.

7. The worm detection method according to claim 3, wherein the session information corresponding to each host comprises information about at least two sessions corresponding to each host, and wherein information about each session in the information about the at least two sessions corresponding to each host comprises at least one of a 5-tuple of the session, a byte quantity of the session, a packet quantity of the session, a transmission control protocol flag of the session, a start time of the session, or an end time of the session; and wherein the data feature corresponding to each host comprises at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments, wherein the quantity of hosts whose port is scanned is a maximum quantity of different hosts on which a same destination port is accessed by the first host, and wherein the short session is a session whose ratio of a byte quantity of the session to a packet quantity of the session is less than a threshold.

8. The worm detection method according to claim 1, further comprising performing, in response to the prediction result indicating that the first host is worm-infected, after the obtaining the prediction result by analyzing the data feature corresponding to the first host:

obtaining a byte quantity of each session corresponding to the first host in the first time window, wherein each session corresponding to the first host is a session generated when the first host actively connects to another host;

obtaining a byte quantity of each session corresponding to a second host in a third time window, wherein the second host is a host to which the first host actively connects in the first time window, wherein the second host is a worm-infected host, wherein each session corresponding to the second host is a session generated when the second host actively connects to another host, wherein a time length of the third time window is the same as a time length of the first time window, and wherein a start time of the first time window is earlier than or equal to a start time of the third time window;

determining whether both the byte quantity of each session corresponding to the first host in the first time window and the byte quantity of each session corresponding to the second host in the third time window meet a first condition, wherein the first condition is associated with a worm probe process and a worm load transfer process;

calculating, in response to both the byte quantity of each session corresponding to the first host in the first time window and the byte quantity of each session corresponding to the second host in the third time window meeting the first condition, a similarity between the byte quantity of each session corresponding to the first host in the first time window and the byte quantity of each session corresponding to the second host in the third time window; and establishing a propagation chain between the first host and the second host in response to the similarity being greater than a threshold.

9. The worm detection method according to claim 8, wherein the first session information comprises information about at least two sessions, and wherein information about each session in the information about the at least two sessions comprises at least one of a 5-tuple of the session, a byte quantity of the session, a packet quantity of the session, a transmission control protocol flag of the session, a start time of the session, or an end time of the session; and wherein the data feature corresponding to the first host comprises at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments, wherein the quantity of hosts whose port is scanned is a maximum quantity of different hosts on which a same destination port is accessed by the first host, and wherein the short session is a session whose ratio of a byte quantity of the session to a packet quantity of the session is less than a threshold.

10. A network device, comprising:
a network interface;
at least one processor; and
a non-transitory memory storing a program for execution by the at least one processor, the program including instructions for:
obtaining first session information of a first host in a first time window through the network interface, wherein the first session information is session information of the first host actively connecting to one or more other hosts, and the first session information comprises information about at least two sessions;
determining, based on the first session information, a data feature corresponding to the first host, wherein the data feature corresponding to the first host describes behavior of the first host accessing the one or more other hosts; and
obtaining a prediction result by analyzing, based on a worm detection model, the data feature corresponding to the first host, wherein the worm detection model is a model generated by training, using a preset training method, data features corresponding to a plurality of hosts in a first network in which the first host is located, and wherein the prediction result indicates whether the first host is worm-infected, and
wherein the data feature corresponding to the first host comprises a quantity of short sessions or a percentage of the quantity of short sessions in a quantity of the at least two sessions, wherein a short session is a session whose ratio of a byte quantity of the session to a packet quantity of the session is less than a threshold.

11. The network device according to claim 10, wherein the program further includes instructions for:
obtaining session information corresponding to each of at least two hosts in a preset time period through the network interface, wherein the session information corresponding to each host is session information of each host actively connecting to one or more other hosts, and wherein the at least two hosts are hosts in the first network;
determining, based on the session information corresponding to each host, a data feature corresponding to each host, wherein the data feature corresponding to each host describes behavior of each host accessing the one or more other hosts; and
training, according to the preset training method, the data feature corresponding to each host to generate the worm detection model.

12. The network device according to claim 11, wherein the program further includes instructions for:
dividing the preset time period into a plurality of time windows, wherein a time length of each of the plurality of time windows is the same as a time length of the first time window;
selecting, from the session information corresponding to each of the at least two hosts, session information corresponding to one host; and
obtaining data features corresponding to each host in the plurality of time windows respectively by obtaining data features corresponding to a selected host in the plurality of time windows respectively until the session information corresponding to each of the at least two hosts is processed, wherein the obtaining data features corresponding to the selected host in the plurality of time windows respectively until the session information corresponding to each of the at least two hosts is processed comprises:

obtaining session information corresponding to the selected host in the plurality of time windows respectively by allocating, based on a start time of the session information corresponding to the selected host, the session information corresponding to the selected host to the plurality of time windows;

determining, based on session information corresponding to the selected host in a second time window in the plurality of time windows, a data feature corresponding to the selected host in the second time window; and obtaining, by analogy, a data feature corresponding to the selected host in each of the plurality of time windows.

13. The network device according to claim 12, wherein information about each session in the information about the at least two sessions comprises at least one of a 5-tuple of the session, a byte quantity of the session, a packet quantity of the session, a transmission control protocol flag of the session, a start time of the session, or an end time of the session; and wherein the data feature corresponding to the first host comprises at least one of a quantity of hosts whose port is scanned, a percentage of a request-packet byte quantity in a total packet byte quantity, or a quantity of connected network segments, and wherein the quantity of hosts whose port is scanned is a maximum quantity of different hosts on which a same destination port is accessed by the first host.

14. The network device according to claim 11, wherein the session information corresponding to each host comprises information about at least two sessions corresponding to each host, and wherein information about each session in the information about the at least two sessions corresponding to each host comprises at least one of a 5-tuple of the session, a byte quantity of the session, a packet quantity of the session, a transmission control protocol flag of the session, a start time of the session, or an end time of the session; and wherein the data feature corresponding to each host comprises at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments, wherein the quantity of hosts whose port is scanned is a maximum quantity of different hosts on which a same destination port is accessed by the first host, and wherein the short session is a session whose ratio of a byte quantity of the session to a packet quantity of the session is less than a threshold.

15. The network device according to claim 10, wherein the program further includes instructions for performing, in response to the prediction result indicating that the first host is worm-infected:

obtaining a byte quantity of each session corresponding to the first host in the first time window through the network interface, wherein each session corresponding to the first host is a session generated when the first host actively connects to another host;

obtaining a byte quantity of each session corresponding to a second host in a third time window through the network interface, wherein the second host is a host to which the first host actively connects in the first time window, wherein the second host is a worm-infected host, wherein each session corresponding to the second host is a session generated when the second host actively connects to another host, wherein a time length of the third time window is the same as a time length of the first time window, and wherein a start time of the first time window is earlier than or equal to a start time of the third time window;

determining whether both the byte quantity of each session corresponding to the first host in the first time window and the byte quantity of each session corresponding to the second host in the third time window meet a first condition, wherein the first condition is associated with a worm probe process and a worm load transfer process;

calculating, in response to both the byte quantity of each session corresponding to the first host in the first time window and the byte quantity of each session corresponding to the second host in the third time window meeting the first condition, a similarity between the byte quantity of each session corresponding to the first host in the first time window and the byte quantity of each session corresponding to the second host in the third time window; and establishing a propagation chain between the first host and the second host when the similarity is greater than a threshold.

16. The network device according to claim 10, wherein the first session information comprises information about at least two sessions, and wherein information about each session in the information about the at least two sessions comprises at least one of a 5-tuple of the session, a byte quantity of the session, a packet quantity of the session, a transmission control protocol flag of the session, a start time of the session, or an end time of the session; and wherein the data feature corresponding to the first host comprises at least one of a quantity of hosts whose port is scanned, a percentage of a request-packet byte quantity in a total packet byte quantity, a quantity of short sessions, a percentage of the quantity of short sessions in a quantity of all sessions, or a quantity of connected network segments, wherein the quantity of hosts whose port is scanned is a maximum quantity of different hosts on which a same destination port is accessed by the first host, and wherein the short session is a session whose ratio of a byte quantity of the session to a packet quantity of the session is less than a threshold.

17. A non-transitory computer-readable medium comprising instructions that, when executed by at least one processor in an apparatus, cause the apparatus to perform the following:

obtaining first session information of a first host in a first time window, wherein the first session information is session information of the first host that is actively connecting to one or more other hosts, and the first session information comprises information about at least two sessions;

determining, based on the first session information, a data feature corresponding to the first host, wherein the data feature corresponding to the first host describes behavior of the first host accessing the one or more other hosts; and obtaining a prediction result by analyzing, based on a worm detection model, the data feature corresponding to the first host, wherein the worm detection model is a model generated by training, using a preset training method, data features corresponding to a plurality of hosts in a first network in which the first host is located, and wherein the prediction result indicates whether the first host is worm-infected, and wherein the data feature corresponding to the first host comprises a quantity of short sessions or a percentage of the quantity of short sessions in a quantity of the at least two sessions, wherein a short session is a session whose ratio of a byte quantity of the session to a packet quantity of the session is less than a threshold.

18. The non-transitory computer-readable medium according to claim 17, wherein information about each session in the information about the at least two sessions comprises at least one of a 5-tuple of the session, a byte quantity of the session, a packet quantity of the session, a transmission control protocol flag of the session, a start time of the session, or an end time of the session; and wherein the data feature corresponding to the first host comprises at least one of a quantity of hosts whose port is scanned, a percentage of a request-packet byte quantity in a total packet byte quantity, or a quantity of connected network segments, and wherein the quantity of hosts whose port is scanned is a maximum quantity of different hosts on which a same destination port is accessed by the first host.

19. The non-transitory computer-readable medium according to claim 17, wherein the instructions, when executed, further cause the apparatus to perform, before obtaining the first session information:

obtaining session information corresponding to each host of at least two hosts in a preset time period, wherein the session information corresponding to each host is session information of each host actively connecting to the one or more other hosts, and wherein the at least two hosts are hosts in the first network;

determining, based on the session information corresponding to each host, a data feature corresponding to each host, wherein the data feature corresponding to each host describes behavior of each host accessing the one or more other hosts; and training, according to the preset training method, the data feature corresponding to each host to generate the worm detection model.

20. The non-transitory computer-readable medium according to claim 19, wherein determining, based on the session information corresponding to each host, the data feature corresponding to each host comprises:

dividing the preset time period into a plurality of time windows, wherein a time length of each time window of the plurality of time windows is the same as a time length of the first time window; and selecting, from the session information corresponding to each of the at least two hosts, session information corresponding to one host; and the instructions, when executed, further cause the apparatus to perform obtaining data features corresponding to each host in the plurality of time windows respectively by obtaining data features corresponding to a selected host in the plurality of time windows respectively until the session information corresponding to each of the at least two hosts is processed, wherein obtaining data features corresponding to the selected host comprises:

obtaining session information corresponding to the selected host in the plurality of time windows respectively by allocating, based on a start time of the session information corresponding to the selected host, the session information corresponding to the selected host to the plurality of time windows;

determining, based on session information corresponding to the selected host in a second time window in the plurality of time windows, a data feature corresponding to the selected host in the second time window; and obtaining, by analogy, a data feature corresponding to the selected host in each of the plurality of time windows.

* * * * *